(12) United States Patent
Chen

(10) Patent No.: US 11,460,364 B1
(45) Date of Patent: Oct. 4, 2022

(54) MULTIPLEXED INDUCTIVE TACTILE SENSOR ARRAY

(71) Applicant: Starrycom Sensing Technologies Inc., Westford, MA (US)

(72) Inventor: Thomas Chen, Westford, MA (US)

(73) Assignee: Starrycom Sensing Technologies Inc., Westford, MA (US)

( * ) Notice: Subject to any disclaimer, the term of this patent is extended or adjusted under 35 U.S.C. 154(b) by 383 days.

(21) Appl. No.: 16/779,734

(22) Filed: Feb. 3, 2020

Related U.S. Application Data

(60) Provisional application No. 62/802,294, filed on Feb. 7, 2019.

(51) Int. Cl.
*G01L 9/00* (2006.01)
*B25J 13/08* (2006.01)
*G01L 5/22* (2006.01)

(52) U.S. Cl.
CPC .......... *G01L 9/0036* (2013.01); *B25J 13/084* (2013.01); *G01L 5/228* (2013.01)

(58) Field of Classification Search
CPC ....... G01L 9/0036; G01L 5/228; B25J 13/084
See application file for complete search history.

(56) References Cited

U.S. PATENT DOCUMENTS 6,826,968 B2 * 12/2004 Manaresi .............. G06F 3/0446
73/862.626
7,857,626 B2   12/2010 Toly
(Continued)

FOREIGN PATENT DOCUMENTS

JP    2014178844 A    9/2014

OTHER PUBLICATIONS

ISR/WO PCT/US2020/016909.
(Continued)

*Primary Examiner* — Max H Noori
(74) *Attorney, Agent, or Firm* — Anderson Gorecki LLP

(57) ABSTRACT

A multiplexed inductive tactile sensor for measuring location and force of contact with an external object includes sense and drive electronics and an array of sensels, each having a drive coil inductively coupled with a sense coil. The array has rows and columns of sensels. Drive coils in each column are electrically connected in series and driven by an AC constant current source through an analog demultiplexer. All sense coils in each row are electrically connected in series and the induced AC voltage across the row is fed to an AC amplifier through an analog multiplexer. The amplified AC voltage is then fed to the amplitude demodulator to generate a DC signal that is dependent on the inductive coupling factor between drive coil and sense coil of a sensel that is selected by being the intersection of the active current drive column and sense row. A first deformable conductive shield layer may be disposed adjacent to a first compressible dielectric layer disposed on first side of a PCB. A second conductive shield layer and a second dielectric layer may be disposed in a similar manner on a second side of the PCB. The controller electronics are configured to measure the induced AC voltage change due to a change in inductive coupling factor between drive coil and sense coil of a selected sensel in response to an external object imparting local mechanical compression onto the first conductive shield layer and the first compressible dielectric layer.

20 Claims, 12 Drawing Sheets

(56) References Cited

U.S. PATENT DOCUMENTS

| | | | |
|---|---|---|---|
| 9,983,744 B2 | 5/2018 | Son | |
| 2007/0214897 A1 | 9/2007 | Ogawa | |
| 2010/0265189 A1* | 10/2010 | Rofougaran | G06F 3/046 345/173 |
| 2014/0009406 A1 | 1/2014 | Guard et al. | |
| 2017/0172489 A1* | 6/2017 | Afentakis | G01N 27/048 |
| 2017/0172490 A1* | 6/2017 | Afentakis | A61B 5/6892 |
| 2021/0124078 A1* | 4/2021 | Widmer | H02J 50/60 |

OTHER PUBLICATIONS

Alireza Rahbar, Flexible Touchpads Based on Inductive Sensors Using COnductive Composite Polymer and Flexible Metal PCB.
Wang, H, Jones, D, de Boer, G orcid.org/0000-0002-5647-1771 et al. (4 more authors) (2018) Design and Characterization of Tri-axis Soft Inductive Tactile Sensors. IEEE Sensors Journal, 18 (19). pp. 7793-7801. ISSN 1530-437X.

\* cited by examiner

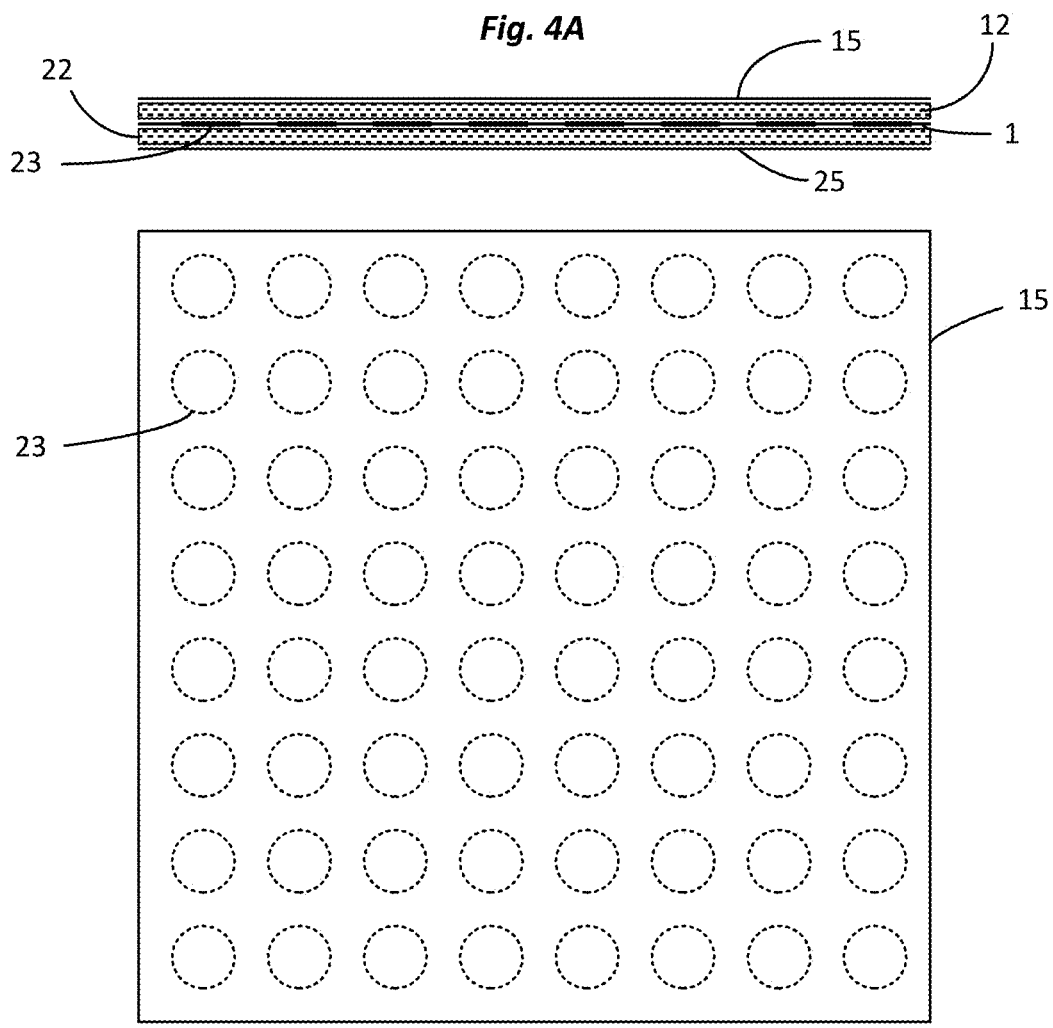
Fig. 4A
Fig. 4B
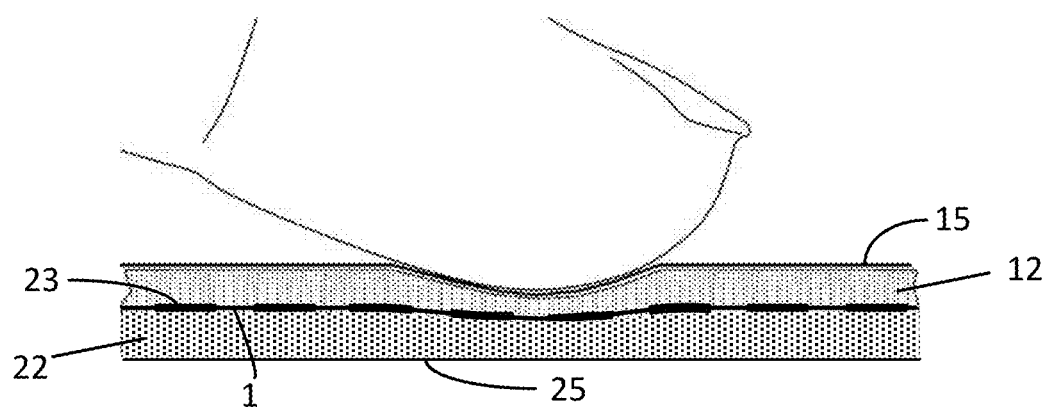
Fig. 5

Fig. 6A
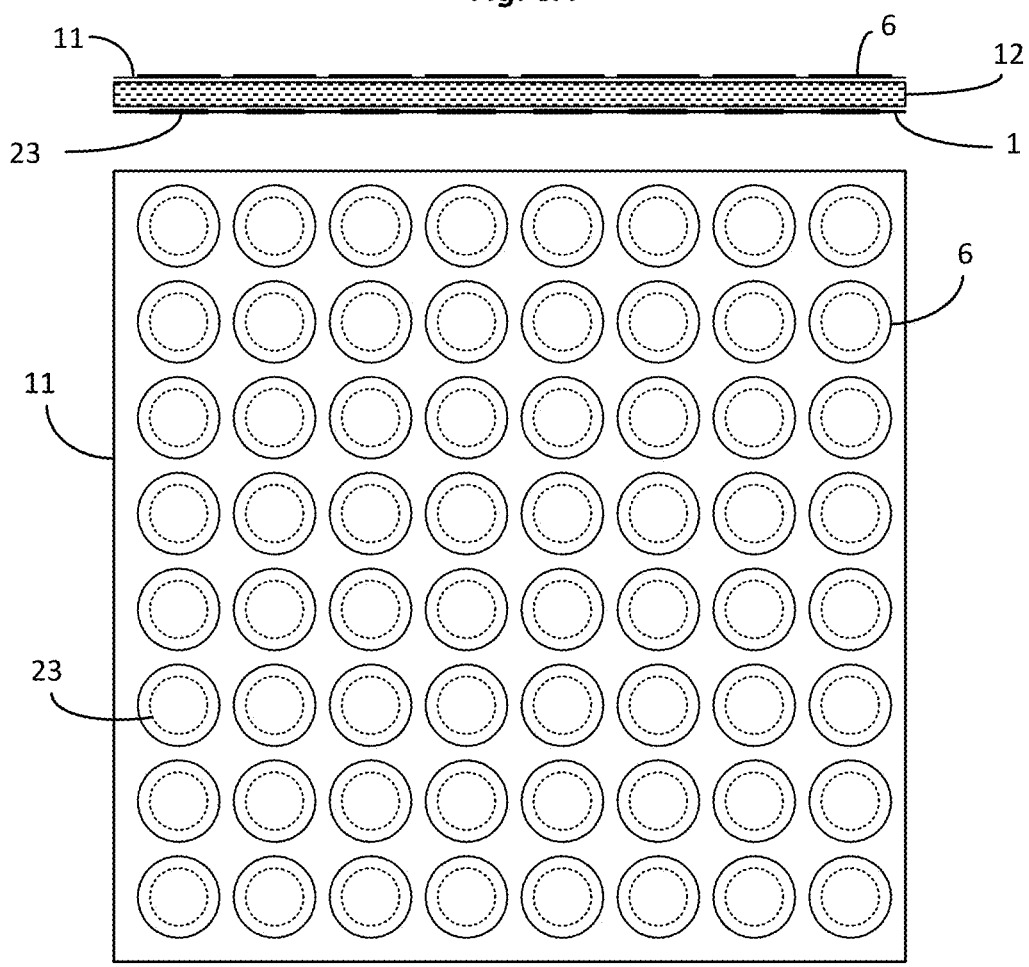
Fig. 6B
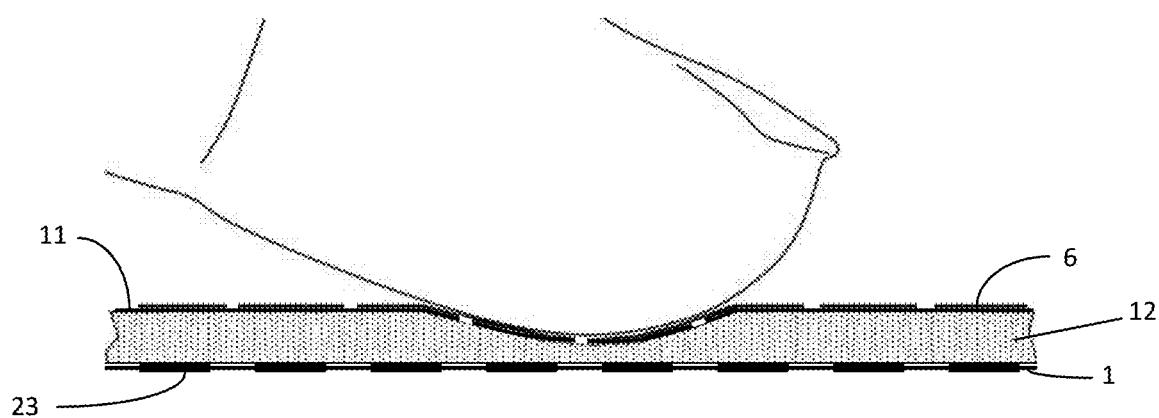
Fig. 7

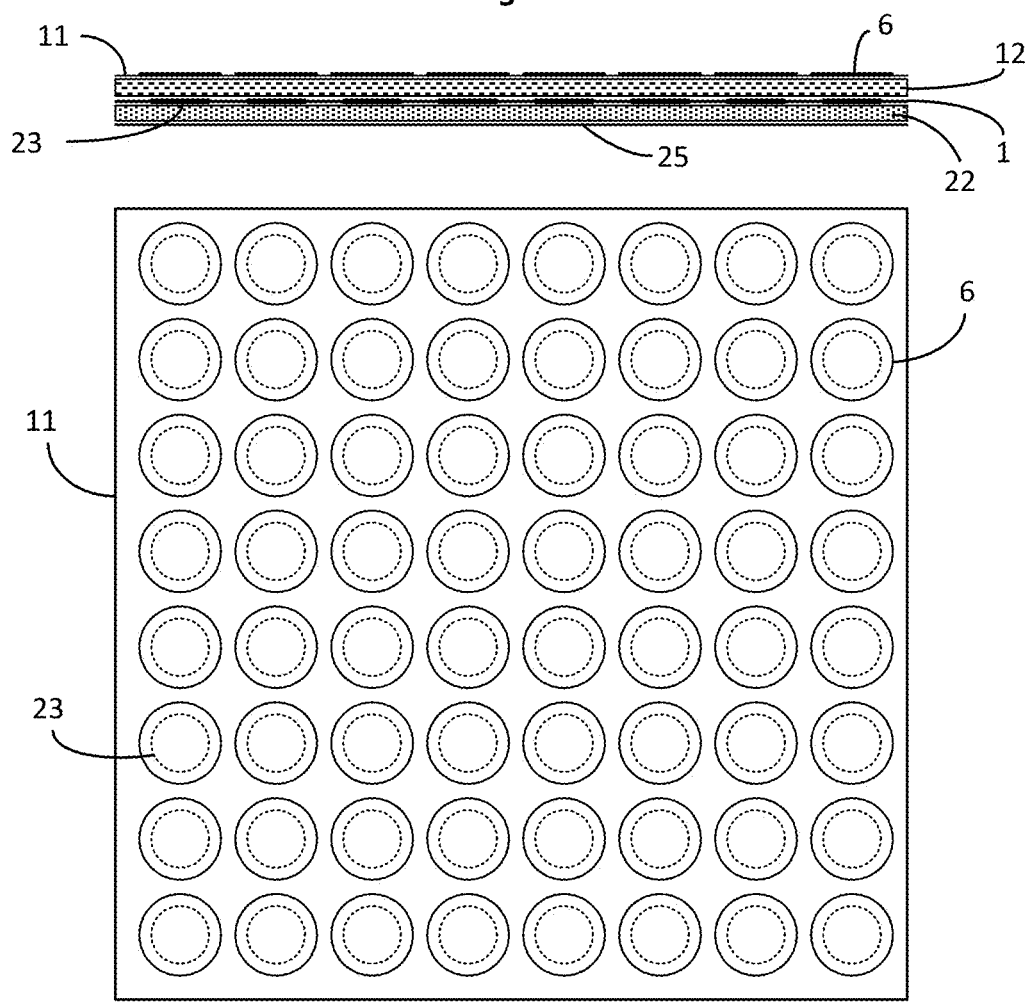
Fig. 8A
Fig. 8B
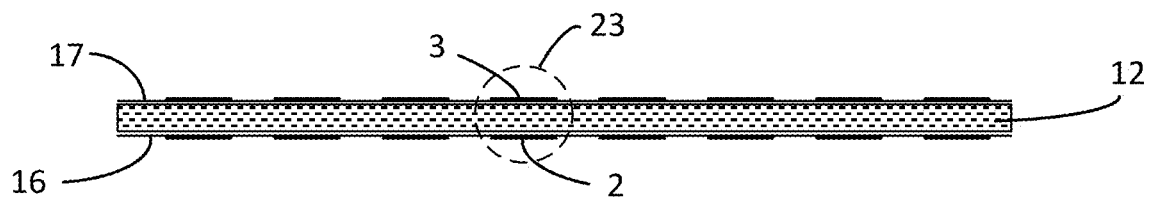
Fig. 9

Drive coil (top) ——
Sense coil (top) ——
Bottom trace ······

MULTIPLEXED INDUCTIVE TACTILE SENSOR ARRAY

TECHNICAL FIELD

The subject matter of this disclosure is generally related to tactile sensors, and more particularly to tactile sensors with inductive sensing elements (sensels).

BACKGROUND AND PRIOR ARTS

Tactile sensors are used for detection of mechanical force, pressure, and other external environmental stimuli. Technologies that commonly use tactile sensors include robotics, computer hardware (e.g., human-machine interface (HMI)), medical devices and systems, environmental monitor systems, and security systems. A typical tactile sensor includes an array of sensels and electronic circuitry that measures changes in the output of the sensels responsive to physical interaction between the sensels and the environmental stimuli. There are various types of sensels, including piezo-resistive, piezoelectric, capacitive, and inductive. Each type of sensel has advantages and drawbacks.

Piezo-resistive sensels function based on the piezo-resistance properties of semiconductors by which electrical resistance changes with applied mechanical strain. The piezo-resistance of the semiconductor material is a function of the mobility of the charge carriers, which itself changes in proportion to the volume of the material. Piezo-resistive sensels are widely used because of their low fabrication cost and high sensitivity. However, because of the nature of the transduction mechanism, the mobility of the charge carriers in the piezo-resistive material also changes with temperature. Consequently, temperature compensation mechanisms are required, which adds to the complexity of the sensor and associated circuitry.

Piezoelectric sensels function by converting an applied mechanical force into an electrical voltage by developing a surface electric charge that is proportional to the applied mechanical force. Commonly used piezoelectric materials include polyvinylidene fluoride (PVDF) polymers, zinc oxide (ZnO), and lead zirconate titanate (PbZrTiO3 or PZT). PVDF polymers are often used because of their flexibility, light weight, high piezoelectric coefficients, dimensional stability and chemical inertness. Piezoelectric sensels advantageously do not require a power supply and can potentially be used in a wider variety of applications. In addition, some piezoelectric materials exhibit a high sensitivity to very small deformations. However, the transduction mechanism is only suitable for detecting dynamically applied mechanical forces because the output voltage of the sensor decays to zero over time if the applied mechanical force is constant. Further, piezoelectric sensels suffer from crosstalk when deployed in an array because the applied force tends to propagate to adjacent sensels, thereby limiting resolution. Moreover, piezoelectric sensels are susceptible to hysteresis.

Capacitive sensels have two conductive plates that are separated by a dielectric material. Capacitance of the sensel is inversely proportional to the distance between the two plates. The structure of the sensel deforms in response to mechanical force or pressure such that the distance between the plates changes, thereby causing a change in capacitance. Capacitive sensels exhibit high sensitivity and good frequency response, high spatial resolution, low temperature sensitivity and large dynamic range. However, capacitive sensels are susceptible to noise and suffer from crosstalk when deployed in an array so complex signal processing and noise reduction circuitry are required.

Inductive sensels have an electric coil and an embedded metal target in front of the coil. When external mechanical force displaces the metal target against the coil an eddy current in the metal target changes and as a result the inductance of the coil changes. The inductance change is measured by electronic circuitry to determine the applied mechanical force. Inductive tactile sensors have been proposed, including for example "Design and Characterization of Tri-axis Soft Inductive Tactile Sensors" by Hongbo Wang et. al. While inductive tactile sensors have the potential advantages of being tolerant to fluid and contaminants, e.g. operating in an underwater environment, they have at least two disadvantages. The change in inductance in response to applied mechanical force is relatively small, so measurement requires relatively complicated electronic circuitry. Further, the massive electrical connections required between the sensels and the associated electronic circuitry are complex and prone to noise and crosstalk. Still further, these disadvantages become more pronounced as the array is scaled up in number of sensels, which limits the maximum scale of the array that is practical in real world applications.

SUMMARY

All examples, aspects and features mentioned in this document can be combined in any technically possible way.

In accordance with some aspects an apparatus comprises: a plurality of inductive sensels arranged in an array comprising rows and columns, each of the sensels comprising a drive coil and a sense coil, wherein the drive coils of the sensels in each column are connected in series and the sense coils of the sensels in each row are connected in series; and circuitry configured to independently select individual ones of the inductive sensels by activating the drive coils of the sensels in one of the columns and the sense coils of the sensels in one of the rows, wherein the sensel at an intersection of the activated column and row is selected and an output of the selected sensel is measured by the circuitry. In some implementations the circuitry performs a scan by individually selecting and measuring outputs of each of the sensels of the array in series. In some implementations the circuitry generates a matrix of measurements corresponding to locations of the corresponding sensels in the array. In some implementations the circuitry generates a time-series of matrices of measurements corresponding to locations of the corresponding sensels in the array. In some implementations the circuitry comprises drive circuitry connected to the drive coils of the sensels, comprising an AC current source and a demultiplexer. In some implementations the circuitry comprises sense circuitry connected to the sense coils of the sensels, comprising a multiplexer and an analog-to-digital converter. In some implementations the sensels are disposed on a printed circuit board (PCB) and a first compressible dielectric layer is disposed on a first side of the PCB. In some implementations a first deformable conductive shield layer is disposed on the first compressible dielectric layer such that the first deformable conductive shield layer is separated from the PCB by the first compressible dielectric layer. In some implementations a second compressible dielectric layer is disposed between the second side of the PCB and a second deformable conductive shield layer. In some implementations conductive targets are disposed on a deformable dielectric film layer disposed on a first compressible dielectric layer which is disposed on the first side of the PCB. In some implementations a second compressible dielectric layer is disposed between the second side of the PCB and a deformable conductive shield layer. In some implementations the drive coils are disposed on a first printed circuit board (PCB), the sense coils are disposed on a second PCB, and the drive coils are separated from the sense coils by a compressible dielectric layer. In some implementations neighboring drive coils and neighboring sense coils are wound in opposite directions. In some implementations the sensels are arranged in groups and wherein each conductive target partially covers a group of four sensels with which the target is associated, an elastomer layer disposed between the sensels and the conductive target. In some implementations the circuitry measures applied force in multiple axes based on the output. In some implementations each conductive target has a corner-truncated square shape.

In accordance with some aspects a tactile sensor comprises: an array of sensels; and circuitry configured to drive a selected group of the sensels of the array, wherein the group comprises fewer than all sensels of the array, and measure an output of one of the sensels of the selected group. In some implementations outputs of the sensels of the array are measured in time-series.

In accordance with some aspects a method comprises: with a tactile sensor comprising an array of sensels, driving a selected group of the sensels of the array with a current source, wherein the group comprises fewer than all sensels of the array; and measuring an output of one of the sensels of the selected group. Some implementations comprise measuring outputs of the sensels of the array in time-series.

Although no advantages should be viewed as limitations to the inventive aspects, some implementations of the multiplexed inductive tactile sensor may improve resistance to electromagnetic noise and ability to function in the presence of liquids, contaminants and other harsh environmental conditions. Further, array size scalability may be improved, and the requisite number of electrical connections within the sensor may be reduced. Reliability of interconnections between the sensel array and the control electronics may also be improved relative to previous designs.

Other aspects, features, and implementations may become apparent in view of the detailed description and figures.

BRIEF DESCRIPTION OF THE FIGURES

FIGS. 4A, 4B, and 5 illustrate a multiplexed inductive tactile sensor with parallel conductive shield layers and parallel compressible dielectric layers disposed on opposite sides of the FPCB.

FIGS. 6A, 6B, and 7 illustrate a multiplexed inductive tactile sensor with a compressible dielectric layer between an array of conductive targets and an array of inductive sensels.

FIGS. 8A and 8B illustrate a multiplexed inductive tactile sensor with conductive targets and parallel conductive shields and parallel compressible dielectric layers disposed on opposite sides of the FPCB.

FIG. 9 illustrates a multiplexed inductive tactile sensor in which an array of drive coils and array of sense coils are separated by a compressible dielectric layer.

DETAILED DESCRIPTION

Figure 1:
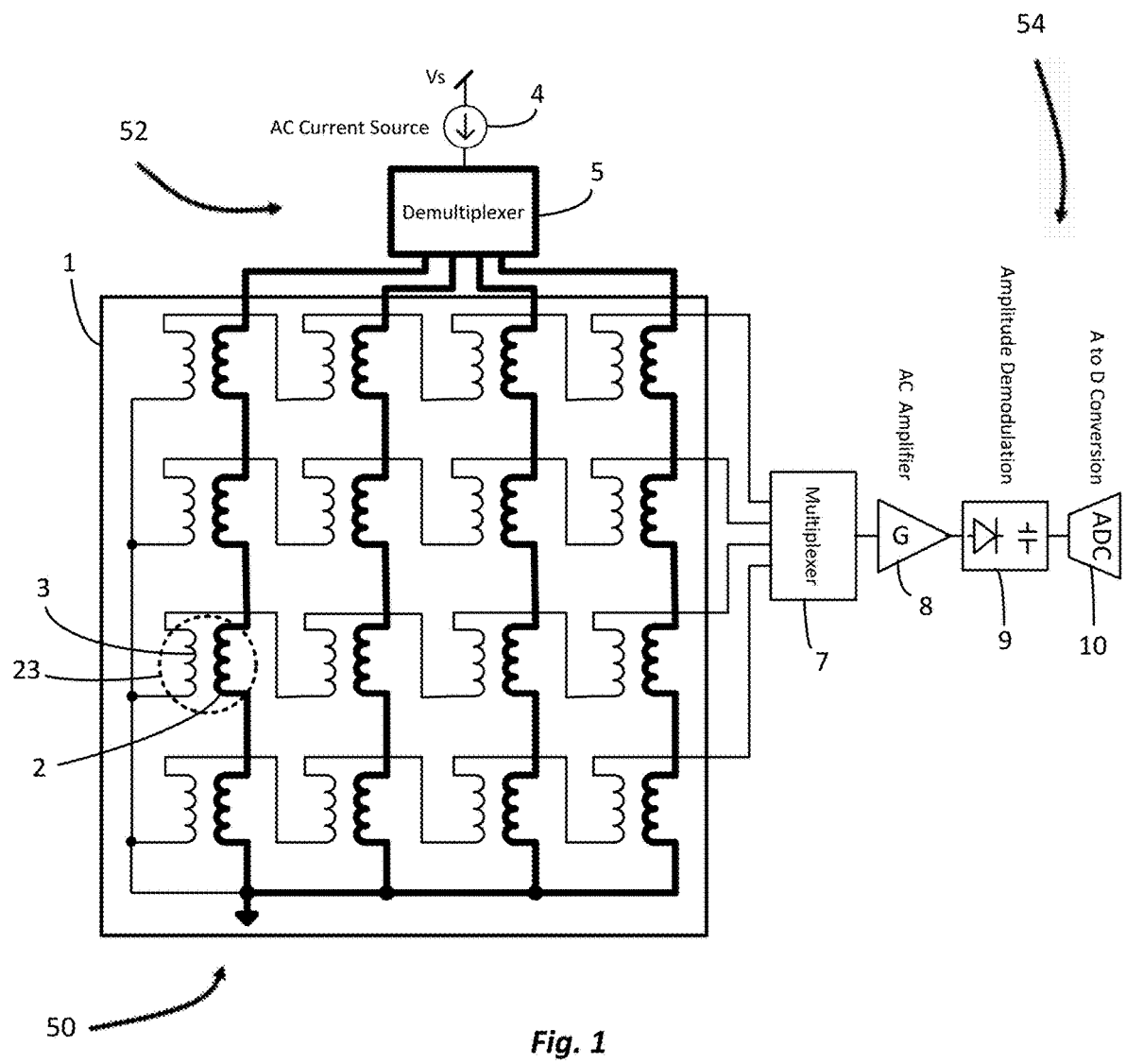
FIG. 1 is an electrical diagram of a multiplexed inductive tactile sensor with a 4×4 sensel array, drive circuitry, and sense circuitry.

FIG. 1 is an electrical diagram of a multiplexed tactile sensor for measuring location and force of touch exerted by an external object. The illustrated multiplexed tactile sensor includes a 4×4 inductive sensel array 50, drive circuitry 52 and sense circuitry 54. The drive circuitry 52 includes an AC current source (4) and a demultiplexer (5). The sense circuitry 54 includes a multiplexer (7), AC amplifier (8), amplitude demodulator (9) and analog to digital converter (ADC) (10). The sensel array includes sixteen sensels (23) disposed on a double-sided or multi-layered flexible or rigid printed circuit board (PCB, FPCB) (1). Each sensel (23) in the array (50) has a drive coil (2) that is inductively coupled with a corresponding sense coil (3). All drive coils (2) in each column (shown vertically) are electrically connected in series and driven by the AC constant current source (4) through the analog demultiplexer (5). All sense coils (3) in each row (shown horizontally) are electrically connected in series and the induced AC voltage across the row is fed to the AC amplifier (8) through the analog multiplexer (7). The amplified AC voltage is fed to the amplitude demodulator (9) to generate a DC signal that is dependent on the inductive coupling factor between the drive coil and the sense coil of the individual sensel that is selected by being the intersection of the active current drive column and the active sense row. Excitation of the serially connected drive coils in a sensel column by the AC constant current source (4) helps to avoid interference and inaccuracy when force is applied to multiple sensels in the same column. Further, the induced AC voltage across the serially connected sense coils in any row will only be affected by the force applied to the particular sensel that is at the crossing (intersection) of the active drive column and present sense row because the AC amplifier (8) has a very high input impedance and as a result only a very small current flows in the sense coil loop. Using the demultiplexer and multiplexer, individual sensels of the array are selected in series and the DC signal of the selected sensel is measured. The sensels may be individually selected in any order or pattern such that each sensel is selected during a scan cycle.

Figure 2:
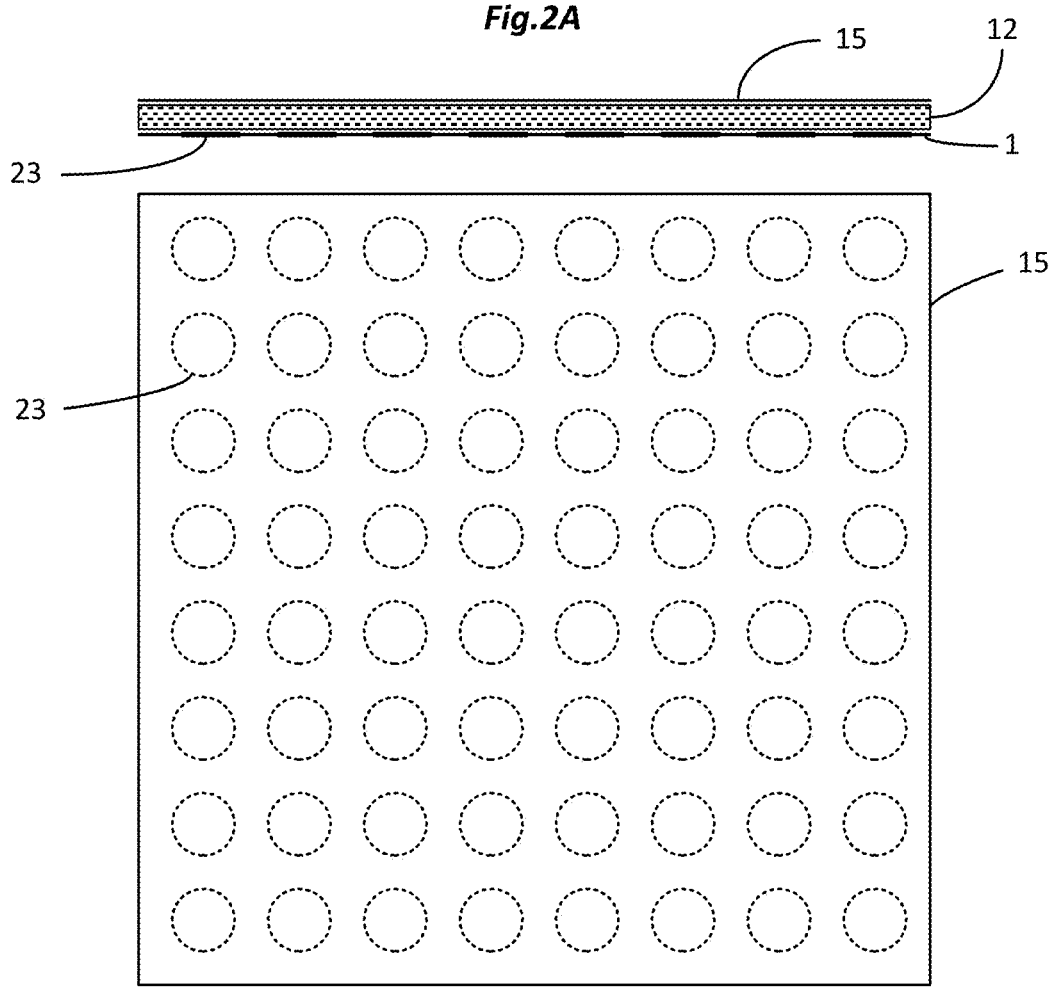
FIGS. 2A, 2B, and 3 illustrate an 8×8 multiplexed inductive tactile sensor with a deformable conductive shield layer and a compressible dielectric layer.
Figure 3:
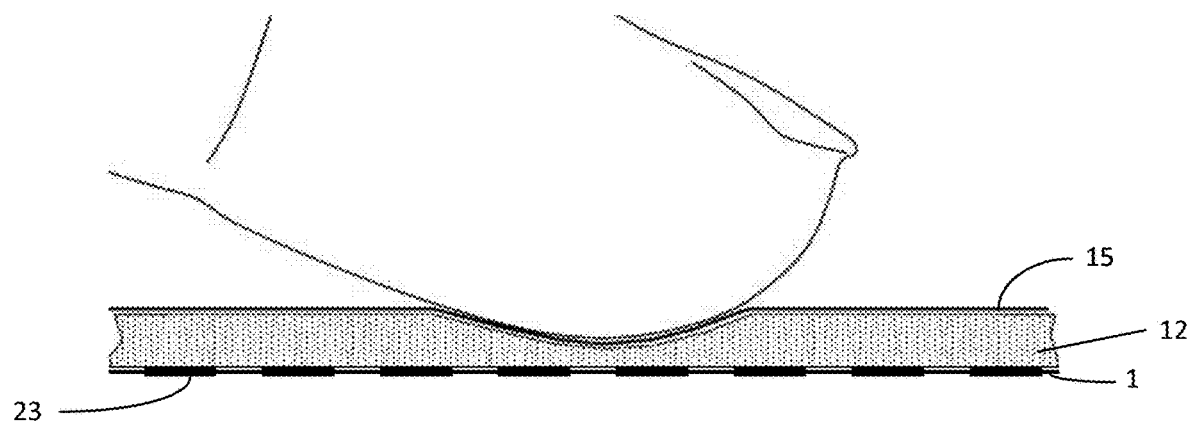

FIGS. 2A, 2B, and 3 illustrate an 8×8 inductive tactile sensor that includes a compressible dielectric layer (12) and a deformable conductive shield layer (15). The compressible dielectric layer (12) is disposed between the sensel array (23) and the deformable conductive shield layer (15). The sensel array is formed on either or both sides of a FPCB (1). In response to an external object such as a human finger touching and applying a normal force to the deformable conductive shield layer (15), the deformable conductive shield layer (15) deforms at the area of contact and the adjacent portion of the dielectric layer (12) is compressed. Consequently, the distance between the conductive shield layer (15) and the sensels (23) proximate to the area of contact decreases in response to the applied mechanical force. The change in distance reduces the inductive coupling factor between the drive coil and the sense coil of the sensels proximate to the area of contact due to the secondary magnetic field generated by an induced eddy current in the conductive shield. As a result, the induced AC voltage in the sense coil loop decreases in amplitude, which is detected when the controller scans those sensels (in series during a scan cycle at the times when the sensel at the intersection of the activated drive coil row and the sense coil column under measurement is selected and the output measured). The compressible dielectric layer (12) is resilient and returns to pre-contact planar shape when the mechanical force is removed.

Figure 10:
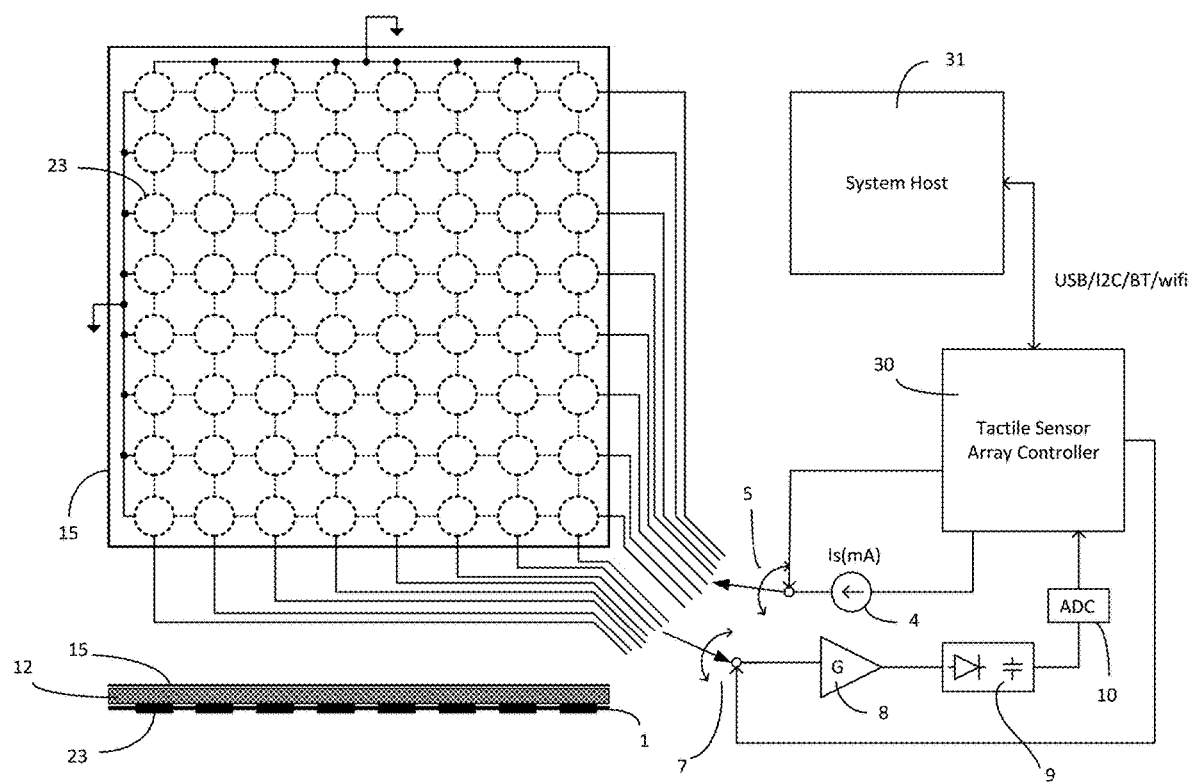
FIG. 10 is a system diagram of a multiplexed inductive tactile sensor with associated electronic circuitry.

Referring to FIGS. 1 and 10, a tactile sensor array controller (30) detects the AC voltage amplitude change through AC amplifier (8) and amplitude demodulator (9) and analog to digital converter (10) and stores the measurement result in a memory location corresponding to the drive coil row and the sense coil column of the selected sensel. After completion of a scanning cycle through all drive coil rows and all sense coil columns, a two-dimensional matrix is formed with each matrix element representing the mechanical force applied to the corresponding sensel at the respective row and column coordinates. Continuous or periodic scanning of the drive coil rows and sense coil columns generates framed two-dimensional numeric matrices over time for real time tactile sensing.

FIGS. 4A, 4B and 5 illustrate a multiplexed inductive tactile sensor with a first deformable conductive shield layer (15) and a second deformable conductive shield (25) in parallel with the sensels (23) and FPCB (1) disposed therebetween. A first compressible dielectric layer (12) is disposed between the sensels (23) and the first deformable conductive shield layer (15). A second compressible dielectric layer (22) is disposed between the sensels (23) and the second deformable conductive shield layer (25). The controller electronics are configured to measure the induced AC voltage change due to a change in inductive coupling factor between drive coil and sense coil of sensels upon the external object imparting local mechanical force against the first conductive shield layer (15) and the first compressible dielectric layer (12). When an external object (such as a human finger) touches and applies a force on the deformable conductive shield layer (15), both compressible dielectric layers (12 and 22) are compressed such that both conductive shield layers (15 and 25) are closer to the array of sensels on the FPCB (1).

FIGS. 6A, 6B, and 7 illustrate a multiplexed inductive tactile sensor with an array of conductive targets (6) made of electrically conductive material or film disposed on a deformable dielectric film (11) that is separated from the sensels (23) and FPCB (1) by a compressible dielectric layer (12). Each sensel (23) is associated with, and covered by, a corresponding target (6) having a contact area that is larger or about the same size as the sensel. When an external object (such as a human finger) touches and applies a mechanical force against the surface of the array of targets, the compressible dielectric layer (12) compresses and one or more of the targets (6) at the contact area moves closer to the corresponding sensels which they respectively cover. The reduced distance between those targets and their corresponding sensels reduces the inductive coupling factor between the drive coil and sense coil of each of those sensels, which decreases the induced AC voltage across the sense coil. The detection of this AC voltage change to measure location and force may be accomplished as already described above.

FIGS. 8A and 8B illustrate an implementation of the multiplexed inductive tactile sensor with conductive targets (6) disposed on a dielectric film (11) and the array of sensels (23) is formed on either or both sides of a FPCB (1). A first compressible dielectric layer (12) is disposed between the sensels (23) and the deformable dielectric film (11) on which the targets (6) are disposed. A second compressible dielectric layer (22) is disposed between a conductive shield layer (25) and the sensels (23).

FIG. 9 illustrates an implementation in which the array of drive coils (2) and sense coils (3) are separated by a compressible dielectric layer (12). The drive coil (2) and sense coil (3) in each sensel (23) are disposed on separate double sided FPCBs (16 and 17). The two FPCBs are separated by the compressible dielectric layer (12). When an external object touches and applies a normal force on the surface of either FPCB (16 or 17), the compressible dielectric layer (12) will be compressed such that one or more of the sense coils (3) moves closer to their corresponding drive coils (2) and as a result the inductive coupling factor between the sense coils and drive coils of those sensels affected will increase. The induced AC voltage across the sense coils will increase and be detected as a tactile sensor signal as already described above.

FIG. 10 is a system diagram of a multiplexed inductive tactile sensor with associated electronic circuitry. A tactile sensor array controller (30) controls the analog demultiplexer (5) to sequentially drive the sensel rows with an AC constant current source. For each activated row, the controller controls the analog multiplexer (7) to feed sensing signals (induced AC voltage) from each sensel column to amplifier (8) and amplitude demodulator (9) for processing and conversion to the digital domain by ADC (10). The converted data is stored in the controller's memory to form a two-dimensional matrix with scanned rows and columns to be used as matrix's x and y coordinates. The matrix is a representation of the force distribution applied to the tactile sensor array. The data can be preprocessed by the controller and then be transferred to the application system host computer via data communication measures such as USB, I2C, or wirelessly via blue tooth (BT) or WIFI, etc.

Figures 11A, 11B:
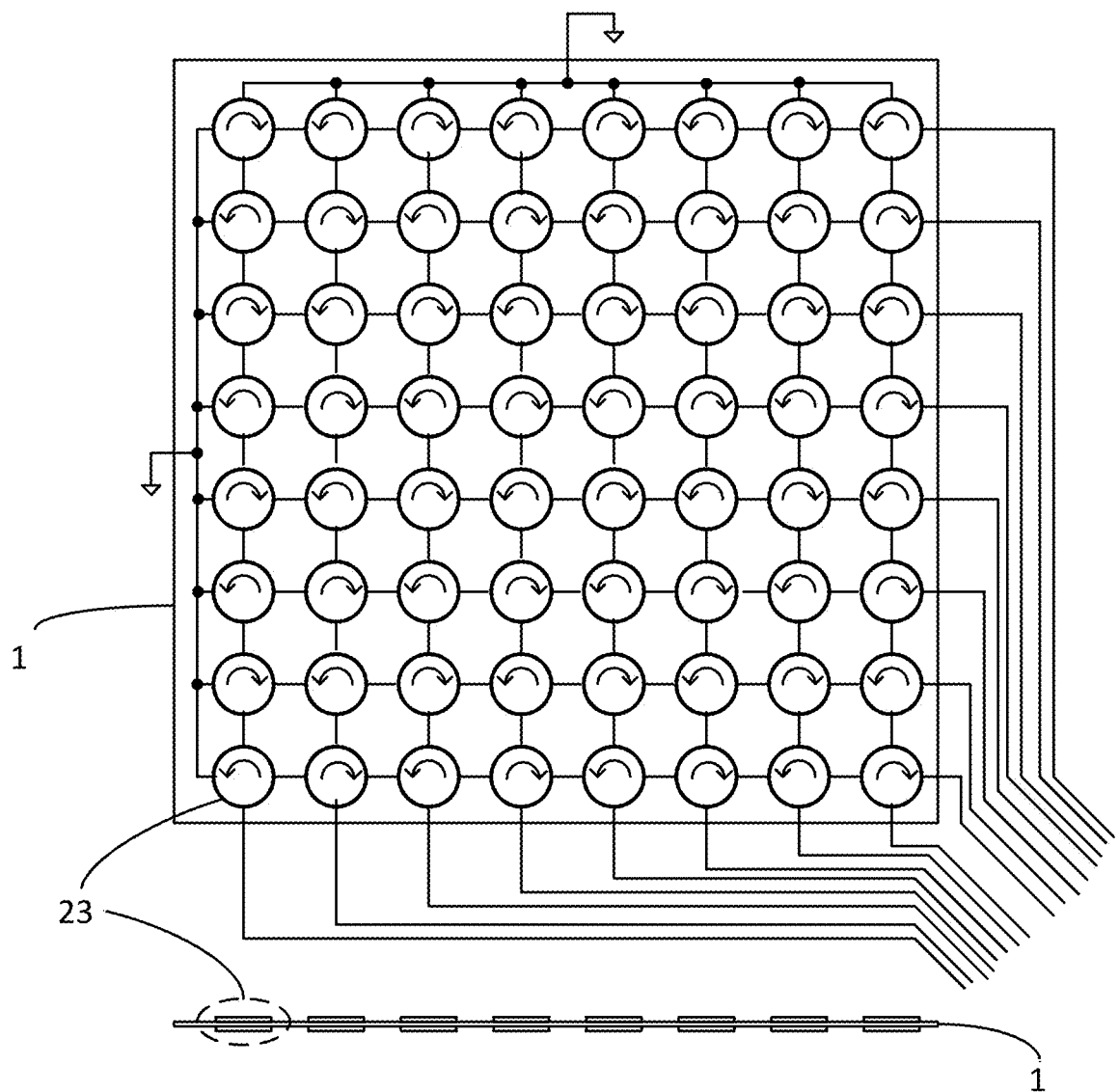
FIGS. 11A and 11B illustrate a coil array design with serially connected coil rows and columns.

FIGS. 11A and 11B illustrate an 8×8 array of sensels (23) in which neighboring (adjacent in row or column) coils are wound in opposite directions (clockwise or counterclockwise as shown by the arrows) for both drive coils and sense coils. The alternating winding directions helps to reduce electromagnetic noise pickup from the environment by the serially connected drive coils and the serially connected sense coils, especially for a large tactile sensor array that has many sensel rows and columns. Noise voltage pickup is substantially cancelled by alternating the winding directions.

Figure 12:
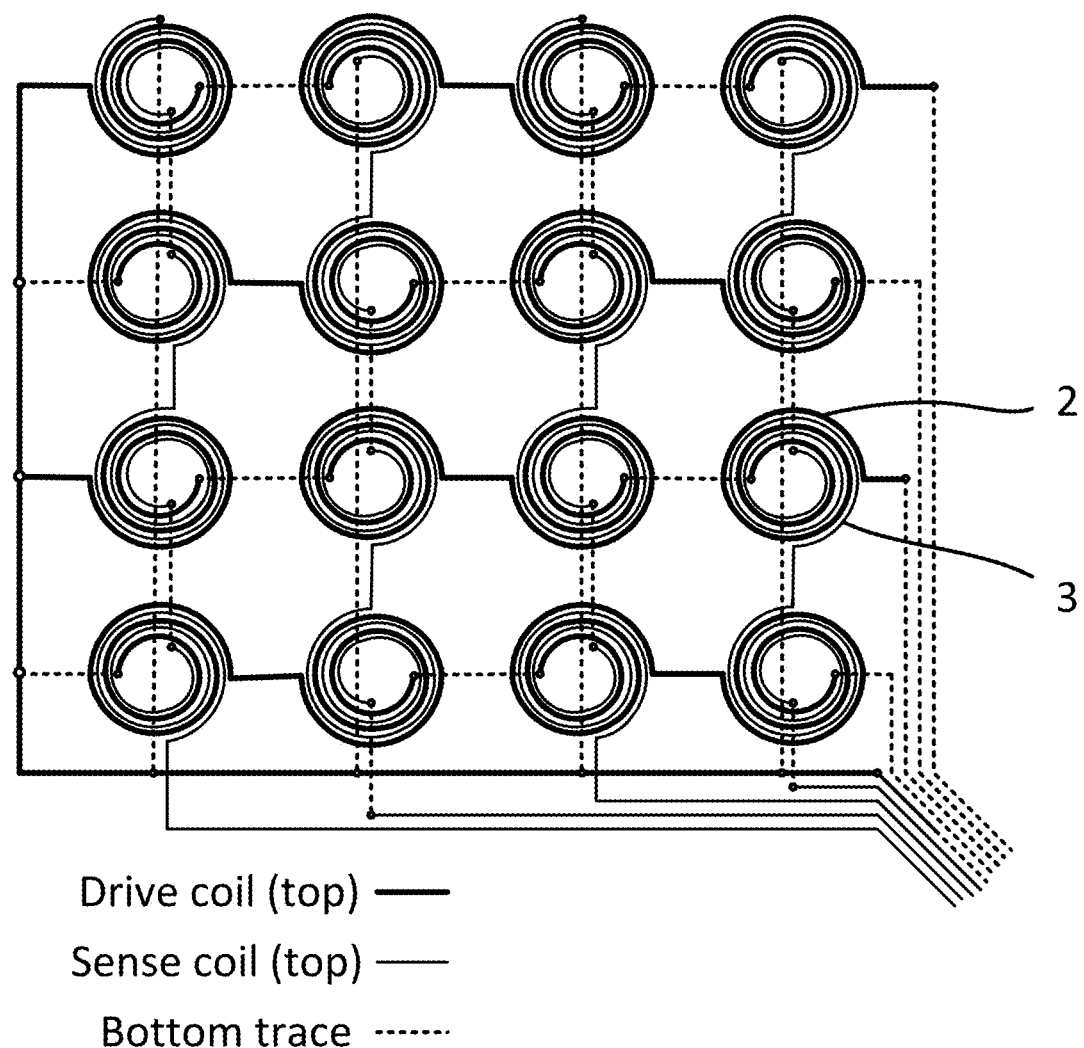
FIG. 12 illustrates a 4×4 array of sensels implemented on a double-sided PCB that has closely coupled drive coils and sense coils and wherein neighboring coils are wound in opposite directions.

FIG. 12 illustrates an implementation of a 4×4 array of sensels disposed on a double-sided PCB that has closely coupled drive coils and sense coils with all neighboring coils (adjacent in row or column) wound in opposite directions. Coil traces are only on one side of a flexible or rigid PCB while the other side of PCB is used only for interconnections. However, the coils could be wound in the same direction (either clockwise or counterclockwise).

Figure 13:
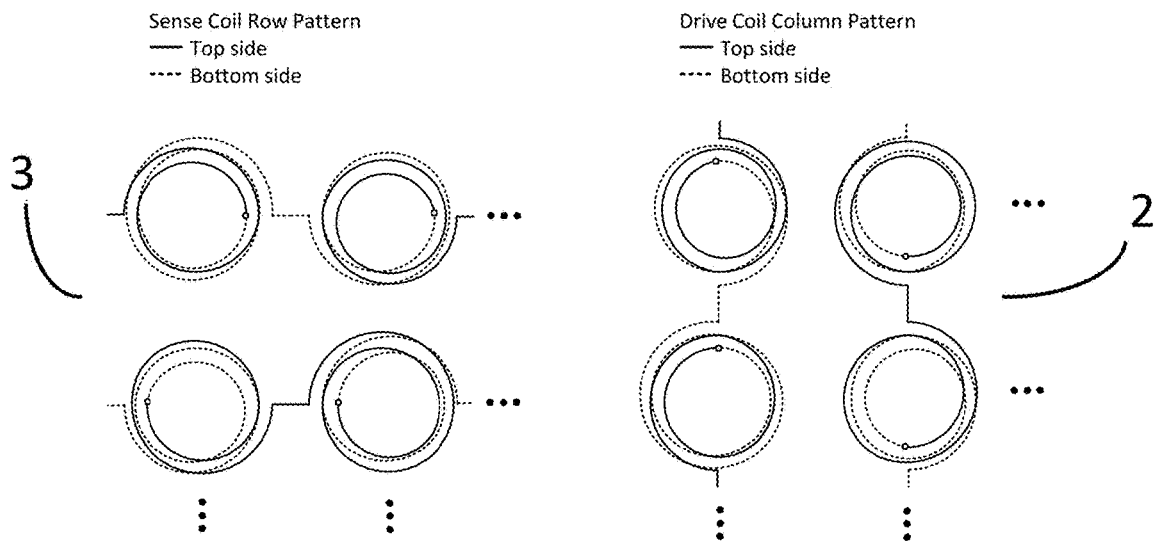
FIG. 13 illustrates a sensel array PCB design using both sides of the PCB for both sense and drive coil traces.

FIG. 13 illustrates a flat coil array design pattern that uses both the top and the bottom sides of the PCB for running coil traces with alternating coil winding directions for neighboring coils in each row and column. This implementation helps to maximize the number of turns possible in a limited PCB space with all neighboring coils wound in opposite directions.

Figure 14:
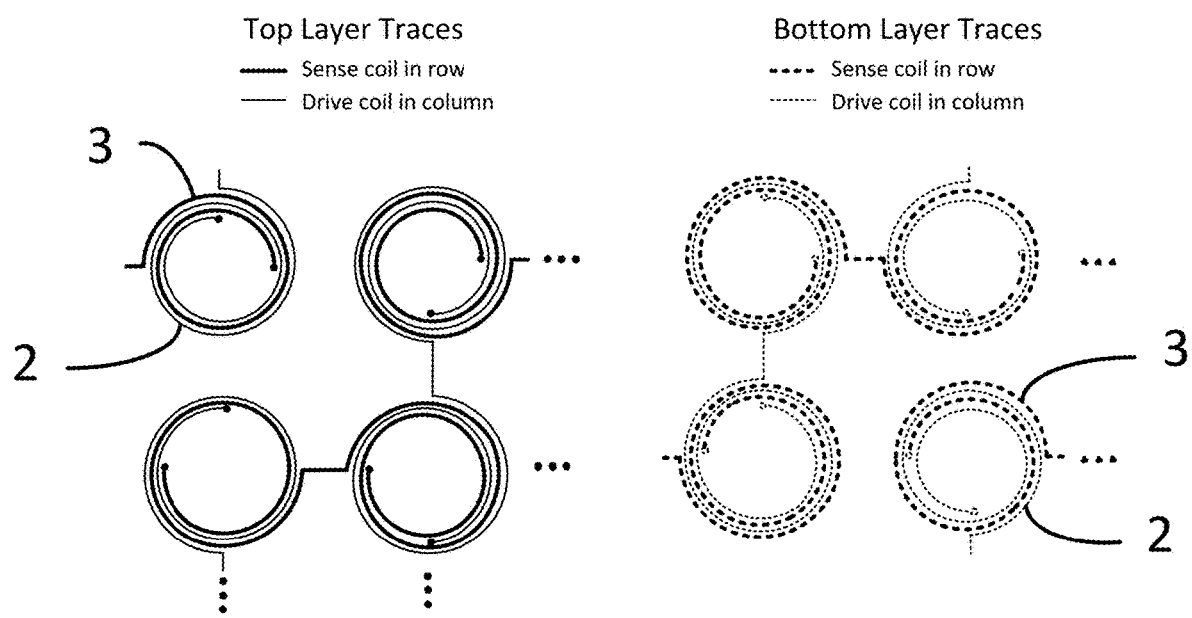
FIG. 14 illustrates the design trace pattern of FIG. 13 on the top side and bottom side of the PCB respectively.
Figure 15A:
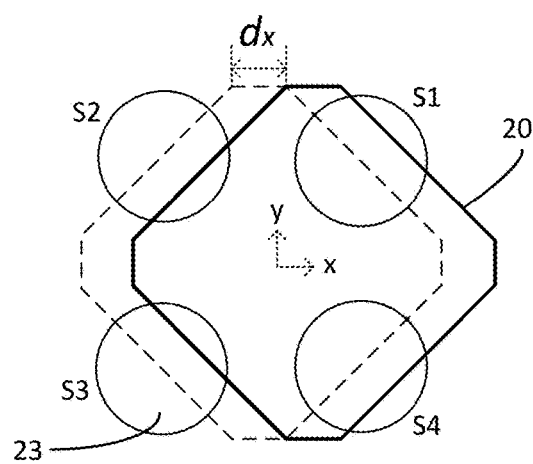
FIGS. 15A, 15B, 16A, and 16B illustrate an inductive multiplexed tactile sensor that can sense applied mechanical force in three axes (x, y, z), with normal force being in z-axis and surface forces in x-axis and y-axis respectively.
Figure 15B:
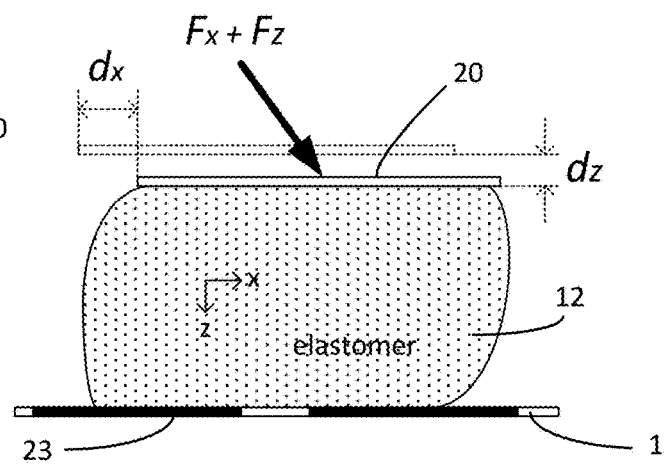

FIG. 14 shows the pattern of top side traces and bottom side traces of the coil array design on a double-sided PCB of FIG. 13. A sensel array of any size can be designed by repeating the design pattern along both row and column directions.

Figures 16A, 16B:
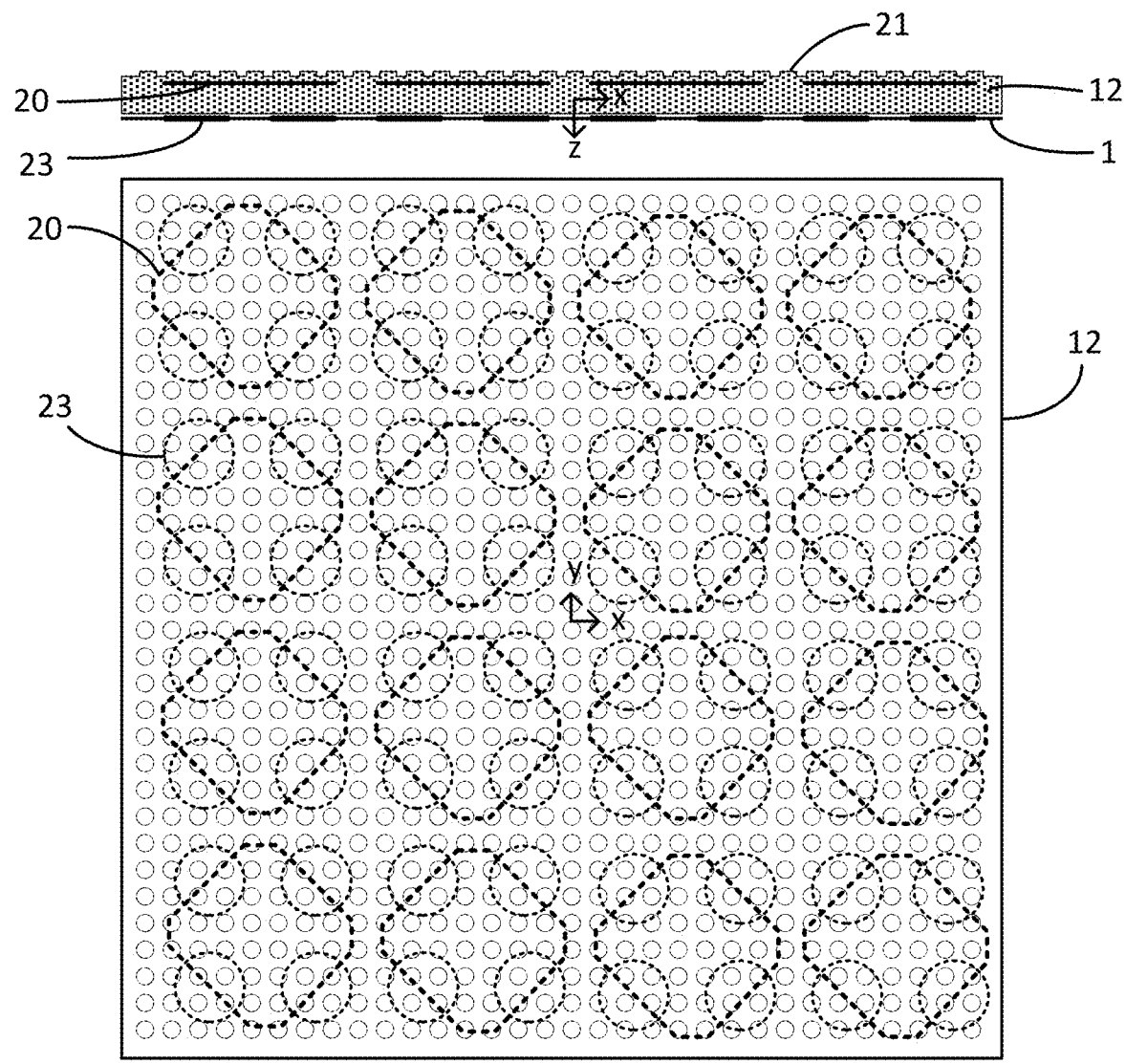

FIGS. 15A, 15B, 16A, and 16B illustrate an inductive multiplexed tactile sensor that can sense applied mechanical force in three axes (x, y, z), with normal force being in z-axis and surface forces in x-axis and y-axis respectively. An 8-sided electrically conductive target (20) is associated with a group of four sensels (23). An elastomer layer (12) is disposed between the targets (20) and sensels (23). Each of the conductive targets (20) has a corner-truncated square shape. Truncating the corners allows for movement in the x axis and y axis relative to neighboring targets. Each target (20) covers the four sensels (23) with which the target is associated. The array of targets is embedded in the layer of elastomer material (12) as shown in FIG. 16A. The top surface of the elastomer layer (21) that covers the conductive targets may be purposely made rough to increase surface friction.

In the absence of applied external force to the target, the target (20) covers half of each of the four associated sensels (23) noted as S1 through S4 (see target drawn in dashed line). When a force in the positive direction of z-axis and x-axis is applied to the target (20), the elastomer layer (12) is compressed and twisted and the target (20) moves a distance dz and dx in the z-axis and x-axis respectively (see target drawn in solid line). Assume V1, V2, V3, V4 are the induced AC voltages of sensels S1, S2, S3 and S4 respectively. The induced voltage by each sense coil can be written as follows:

$$V1 = k1(x,y,z) \cdot Vs = k(x,y,z) \cdot Vs \qquad (a)$$

$$V2 = k2(x,y,z) \cdot Vs = k(-x,y,z) \cdot Vs \qquad (b)$$

$$V3 = k3(x,y,z) \cdot Vs = k(-x,-y,z) \cdot Vs \qquad (c)$$

$$V4 = k4(x,y,z) \cdot Vs = k(x,-y,z) \cdot Vs \qquad (d)$$

Here ki(x,y,z) and k(x,y,z) are the inductive coupling factors which are functions of the target position, and Vs is the AC voltage across the drive coil. By taking the differential of these coupling factor functions with respect to x, y, z we have:

$$dk1 = \frac{\partial k}{\partial x}dx + \frac{\partial k}{\partial y}dy + \frac{\partial k}{\partial z}dz \qquad (e)$$

$$dk2 = -\frac{\partial k}{\partial x}dx + \frac{\partial k}{\partial y}dy + \frac{\partial k}{\partial z}dz \qquad (f)$$

$$dk3 = -\frac{\partial k}{\partial x}dx - \frac{\partial k}{\partial y}dy + \frac{\partial k}{\partial z}dz \qquad (g)$$

$$dk4 = \frac{\partial k}{\partial x}dx - \frac{\partial k}{\partial y}dy + \frac{\partial k}{\partial z}dz \qquad (h)$$

Let's define dkx=(dk1−dk2−dk3+dk4), dky=(dk1+dk2−dk3−dk4) and dkz=(dk1+dk2+dk3+dk4) and further define the following $$dVx = Vs \cdot dkx = Vs(dk1 - dk2 - dk3 + dk4) = \qquad (i)$$
$$dV1 - dV2 - dV3 + dV4 = 4\frac{\partial k}{\partial x}Vs \cdot dx$$

$$dVy = Vs \cdot dky = Vs(dk1 + dk2 - dk3 - dk4) = \qquad (j)$$
$$dV1 + dV2 - dV3 - dV4 = 4\frac{\partial k}{\partial y}Vs \cdot dy$$

$$dVz = Vs \cdot dkz = Vs(dk1 + dk2 + dk3 + dk4) = \qquad (k)$$
$$dV1 + dV2 + dV3 + dV4 = 4\frac{\partial k}{\partial z}Vs \cdot dz$$

We notice that dVx is proportional to dx, dVy is proportional to dy, and dVz is proportional to dz. Let's further use function $x=g_x(Fx)$ to describe x-axis displacement x as a function of force applied in the x-axis direction Fx, a characteristic of the elastomer used, and from equation (i) we have:

$$dVx = dV1 - dV2 - dV3 + dV4 = 4\frac{\partial k}{\partial x}Vs \cdot dx = 4Vs\frac{\partial k}{\partial x}\frac{dg_x}{dFx}dFx \qquad (1)$$

And likewise, we have $$dVy = Vs(dk1 + dk2 - dk3 - dk4) = \qquad (m)$$
$$dV1 + dV2 - dV3 - dV4 = 4Vs\frac{\partial k}{\partial y}\frac{dg_y}{dFy} \cdot dFy$$

And $$dVz = Vs(dk1 + dk2 + dk3 + dk4) = \qquad (n)$$
$$dV1 + dV2 + dV3 + dV4 = 4Vs\frac{\partial k}{\partial z}\frac{dg_z}{dFz} \cdot dFz$$

So dVx, dVy and dVz can be used as measurements for tri-axis forces dFx, dFy and dFz.

A tactile sensor using a sensel array as described above can sense forces in three axes, i.e. normal (z-axis) and surface (x-axis and y-axis).

Several features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

The invention claimed is:

1. An apparatus comprising:
   a plurality of inductive sensels arranged in an array comprising rows and columns, each of the sensels comprising a drive coil and a sense coil, wherein:
      windings of both the drive coil and the sense coil of each sensel are wound in the same direction and attach to a first side of a substrate;
      the drive coils of the sensels in each column are connected in series; and
      the sense coils of the sensels in each row are connected in series; and
   circuitry configured to independently select individual ones of the inductive sensels by activating the drive coils of the sensels in one of the columns and the sense coils of the sensels in one of the rows, wherein the sensel at an intersection of the activated column and row is selected and an output of the selected sensel is measured by the circuitry.

2. The apparatus of claim 1 wherein the circuitry performs a scan by individually selecting and measuring outputs of each of the sensels of the array in series.

3. The apparatus of claim 2 wherein the circuitry generates a matrix of measurements corresponding to locations of the corresponding sensels in the array.

4. The apparatus of claim 3 wherein the circuitry generates a time-series of matrices of measurements corresponding to locations of the corresponding sensels in the array.

5. The apparatus of claim 1 wherein the circuitry comprises drive circuitry connected to the drive coils of the sensels, comprising an AC current source and a demultiplexer.

6. The apparatus of claim 1 wherein the circuitry comprises sense circuitry connected to the sense coils of the sensels, comprising a multiplexer and an analog-to-digital converter.

7. The apparatus of claim 1 wherein the sensels are disposed on a printed circuit board (PCB) and a first compressible dielectric layer is disposed on a first side of the PCB.

8. The apparatus of claim 7 comprising a first deformable conductive shield layer disposed on the first compressible dielectric layer such that the first deformable conductive shield layer is separated from the PCB by the first compressible dielectric layer.

9. The apparatus of claim 8 comprising a second compressible dielectric layer disposed between a second side of the PCB and a second deformable conductive shield layer.

10. The apparatus of claim 7 comprising conductive targets disposed on a deformable dielectric film layer disposed on a first compressible dielectric layer which is disposed on the first side of the PCB.

11. The apparatus of claim 10 comprising a second compressible dielectric layer disposed between the second side of the PCB and a deformable conductive shield layer.

12. The apparatus of claim 1 wherein the drive coils are disposed on a first printed circuit board (PCB), the sense coils are disposed on a second PCB, and the drive coils are separated from the sense coils by a compressible dielectric layer.

13. The apparatus of claim 1 wherein:
the drive coils that are adjacent in each column are wound in opposite directions;
the drive coils of sensels that are adjacent in each row are wound in opposite directions;
the sense coils of sensels that are adjacent in each row are wound in opposite directions; and
the sense coils of sensels that are adjacent in each column are wound in opposite directions.

14. The apparatus of claim 1 wherein the sensels are arranged in groups and wherein each conductive target partially covers a group of four sensels with which the target is associated, an elastomer layer disposed between the sensels and the conductive target.

15. The apparatus of claim 14 wherein the circuitry measures applied force in three axes based on the output.

16. The apparatus of claim 15 wherein each conductive target has a corner-truncated square shape.

17. A tactile sensor comprising:
an array of inductive multiplexed sensels comprising multiple groups;
a plurality of electrically conductive targets, each target configured to cover a portion of each of the sensels of one of the groups in the absence of applied external force;
an elastomer disposed between the targets and the sensels; and
circuitry configured to drive a selected group of the sensels and measure an output of one of the sensels of the selected group.

18. The tactile sensor of claim 17 wherein outputs of the sensels of the selected group indicate applied mechanical force in three axes.

19. A method comprising:
with a tactile sensor comprising an array of inductive multiplexed sensels comprising multiple groups of sensels, each group associated with an electrically conductive target that covers a portion of each of the sensels of the group in the absence of applied external force, driving the sensels of a selected group of sensels with a current source, wherein the group comprises fewer than all sensels of the array; and
measuring an output of one of the sensels of the selected group.

20. The method of claim 19 comprising calculating applied mechanical force in three axes from outputs of the sensels of the selected group.

* * * * *